United States Patent [19]

Whetstone et al.

[11] 4,451,698

[45] May 29, 1984

[54] COORDINATE DIGITIZING DEVICE

[75] Inventors: Albert L. Whetstone, Stratford; Kerry L. Shaklee, Fairfield, both of Conn.

[73] Assignee: Display Interface Corporation, Milford, Conn.

[21] Appl. No.: 440,848

[22] Filed: Nov. 12, 1982

[51] Int. Cl.³ .............................................. G08C 21/00
[52] U.S. Cl. ....................................................... 178/19
[58] Field of Search ....................... 178/19, 18; 33/1 M

[56] References Cited

U.S. PATENT DOCUMENTS 3,593,115  7/1971  Dym et al. ............................. 178/19
4,186,272  1/1980  Kobayashi et al. ................... 178/19

Primary Examiner—Stafford D. Schreyer
Attorney, Agent, or Firm—Cifelli, Frederick & Tully

[57] ABSTRACT

Coordinate digitizers comprise a data tablet having perpendicular X and Y axes grids, which cross each other to define a data surface. Each grid has a plurality of parallel evenly-spaced-apart grid wires having their ends connected by end busses. An inductor connected to an alternating electrical input signal is movable on the data surface, and induces current flow in loops comprised of individual grid wires and end busses, with the strength of the current strongest in the grid wires near the inductor. Each grid has a receptor loop into which signals from the grid are induced, and the receptor loop is preferably deployed in a receptor area off the data surface. The receptor loops are configured such that signals induced therein correlate to inductor position on the data surface. The receptor loops are preferably composite loops providing complimentary signals to compensate for variations in the input signal or an induction-to-grid coupling. The data tablet may be translucent and backlighted to form a light-box digitizer. A microprocessor calculates inductor position from the receptor loop signals. A self-contained cursor comprising an inductor coil, signal generator means and a battery power supply in a housing for use on the data tablet eliminates input leads.

37 Claims, 13 Drawing Figures

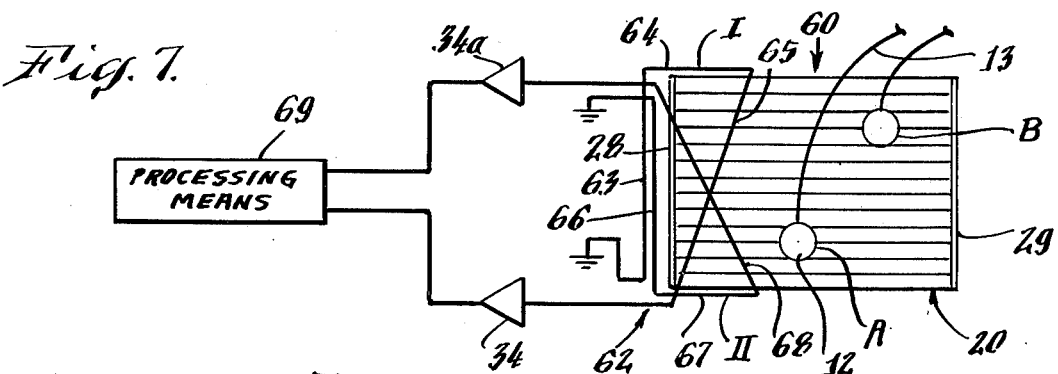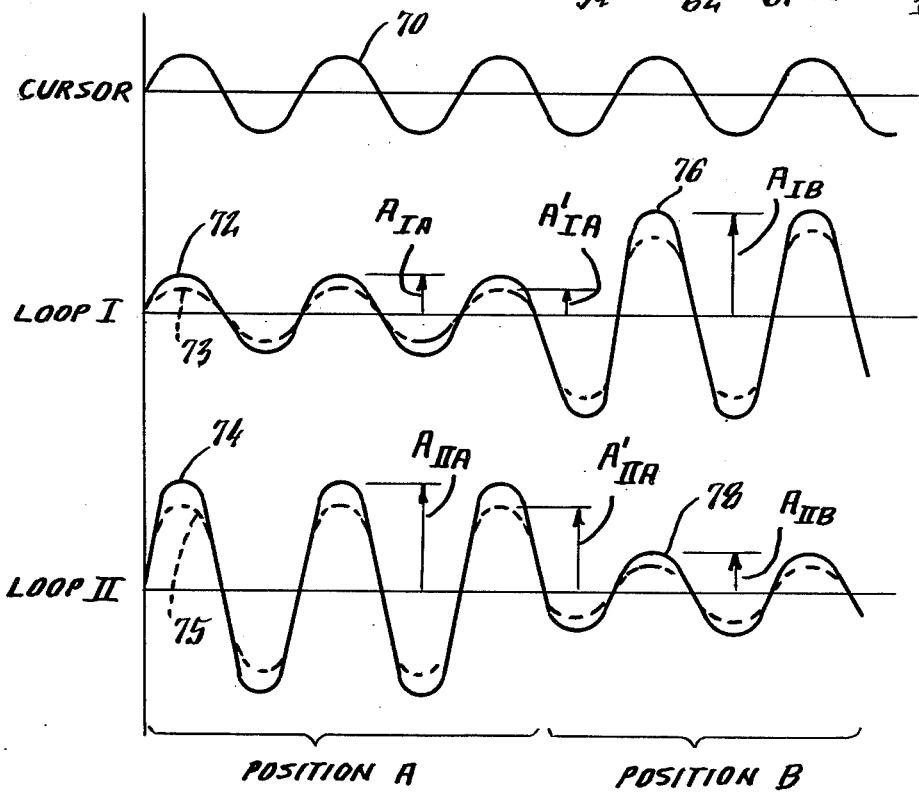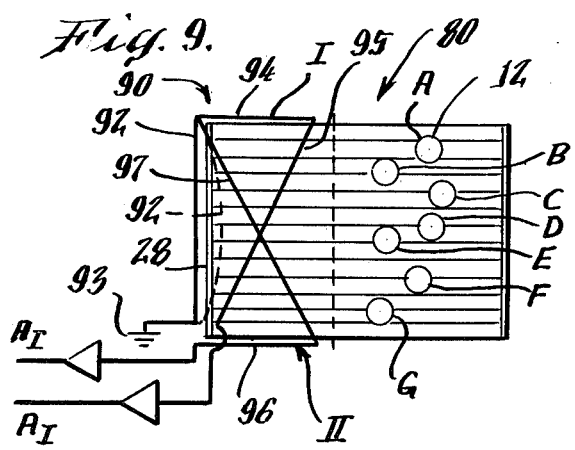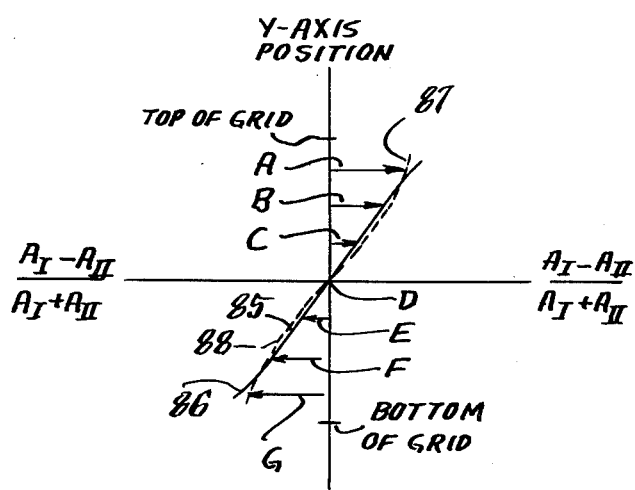

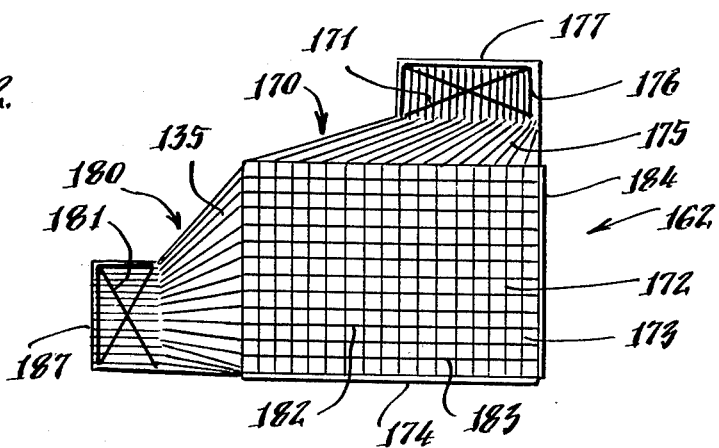
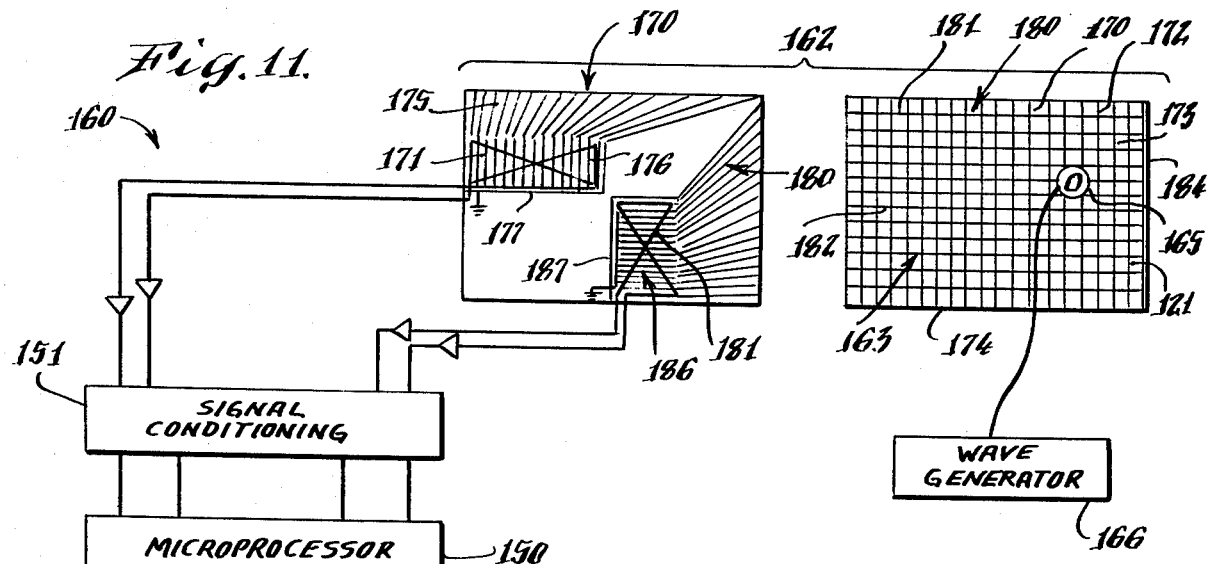
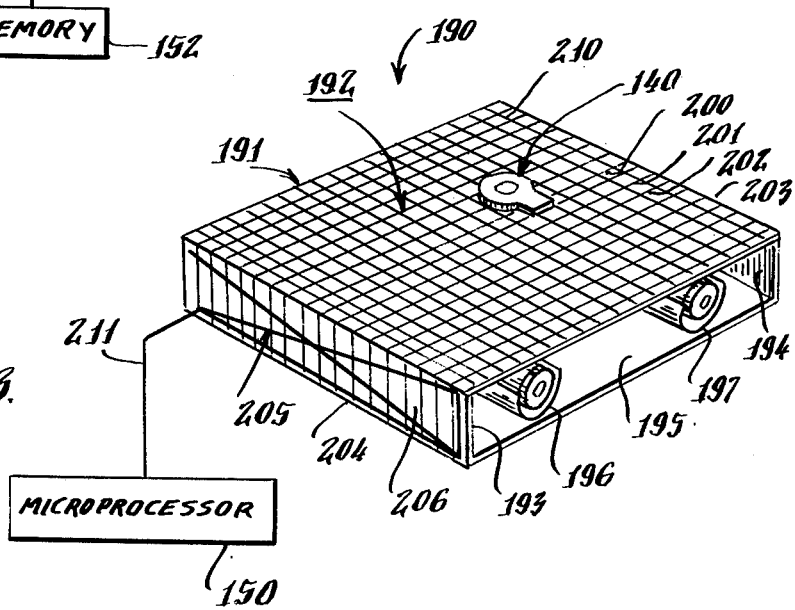

COORDINATE DIGITIZING DEVICE

BACKGROUND OF THE INVENTION

This invention relates to a coordinate digitizing device, and more particularly to a coordinate digitizing device in which induced electrical signals provide the coordinate-indicative information.

Graphical data devices requiring position location are commonly employed in such areas as facsimile transmission and as computer data input devices. The earlier forms of such devices employed a stylus, or cursor, in the form of a writing implement or pointer device mechanically coupled to a set of arms for translating the movement thereof into a sequence of usable information signals. Such arrangements are unsatisfactory in that they present undesirable frictional and inertial limitations. One variation of the foregoing arrangement employed a sheet resistance material to provide an x/y coordinate designation, but such devices often present linearity, resolution and uniformity problems giving rise to erroneous information, and have been generally unreliable.

In other forms, light pens may provide graphical data but require interaction with cathode ray display devices and are thus limited in usefulness. One attempt made to overcome the foregoing difficulties has been the employment of a sonic transducing coordinate digitizer requiring some form of acoustic transmission either through the atmosphere or through a surface to a set of receptor devices. The signal source is in the nature of a vibrational or sonic wave generation device. The vibrational device operates conventionally by the use of tuned crystal time base and pick-up devices acoustically coupled through the subsurface of a two dimensional digitizing area. The accuracy of tuning is important in such devices and requires extensive constructional detail and expensive components. The sonic wave generation devices rely upon atmospheric transmission of a sound wave generated at the location determined by the sound source with respect to the sound receivers. Use of atmospheric transmission, however, has proven to give rise to inaccuracies, non-uniformity and loss of resolution as a result of variation in effective ambient conditions. The speed of sound will vary considerably over a temperature range, and it is necessary to provide some means of temperature compensation in order to provide accurate reproduceability of coordinate digitization using an atmospheric transmission system. In addition, the atmospheric transmission system is subject to Doppler effect error and propagation time error due to draft conditions, and to extant noise conditions, all resulting in erroneous information. Finally, atmospheric transmission systems require a specific sound source, which often proves objectionable from a noise level view point as well as in providing certain discomfort and inconvenience, particularly in light of the requirement of an audible sound source to be positioned at the tip of a writing stylus hand-held by an operator.

Another suggested alternative has been deployment of an array of embedded wires positioned in a data surface or subsurface along x/y coordinates. In the embedded wire system, the stylus provides some means for generating a magnetic field which is picked up in the location corresponding to the closest coordinate intersection of the x/y wire position within the subsurface. The signal thus transduced into the subsurface wire array is picked up by means of a suitable receptor located at the ends of the respective wires and the position of the respective wires thereby digitized. Conventional means for accomplishing the foregoing effect have employed digital logic circuitry responsive to the presence of induced pulses along the appropriate x/y wire lines corresponding to the position of the transduced pulses. This method is extremely expensive to reproduce in order to derive the required resolution. In addition, the wires must be precisely positioned within the array, since error due to a misplaced wire will be significant. Further, the system is not absolute, but rather digitizes only with respect to an initial position. An alternative to the foregoing form employs the use of delay lines terminating the x/y wire array, the time delay required for the pulse induced in an x/y wire to traverse the delay line terminating the respective x/y array wires being digitized and thereby providing a digital coordinate location. The foregoing method, however, also provides certain expense in achieving the required accuracy necessary for the connection of the delay lines to the x/y array wires. In addition, the foregoing method requires extremely accurate placement of the x/y wire array with respect to the delay lines in order to avoid gross inaccuracies in coordinate position. The care that must be taken in assembling such an array gives rise to a high cost as well as complicating accurate reproduction of information with respect to pluralities of such arrays.

One proposed solution is set forth in U.S. Pat. No. 3,846,580. In the device disclosed therein, a position determination device is provided with an array of a plurality of transmission media. The transmission media are preferably an array of parallel wires arranged along a horizontal or x axis and a further array of wires arranged along a vertical or y axis. Coordinate location is accomplished by digitizing the time delay required for an induced pulse to traverse the transmission media from a generation point to a reception point. Specifically, a field generating device is positioned in proximity to the surface at a location to be digitized. Further means are provided for triggering the production of a magnetic field by the field generating device, the magnetic field transducing a propagating vibrational mode into the transmission media. Pick-up means are coupled to the transmission media and respond to the propagating vibrational mode for providing a signal to a utilization device which will respond to the means triggering production of the field as well as to the pick-up means in order to provide a position signal corresponding to the time of propagation of the vibrational mode from its time of generation to its time of pick-up. The vibrational mode is effected by means of a strain wave magnetostrictively induced by the magnetic field into the transmission media. The transmission media constitutes a plurality of magnetostrictive wires arrayed along the support surface. The magnetic field generating device may be an individual stylus in the shape of a writing implement of a cursor. The field may be energized by means of a series of pulses or by individual pulses as desired. In further detail, a data digitizer is coupled both to the pick-up and the field generation device for digitizing the time duration between the field generation and the reception by the pick-up device, thus providing a data signal representative of such duration. The duration is actually a measure of the elapsed time required for the strain wave generated to propagate to the pick-up.

The data thus provided may be fed to a computer memory for temporary or permanent storage and will be retrieved when desired. By storing, and later retrieving, the image may be recalled for display on a suitable cathode ray tube or like display device. The data may also be fed directly to a display device by conversion of the digitized signals to analog magnitude and display thereof as a continuous series of signals on the face of the cathode ray tube. The data may also be used to address a ROM and thereby be transferred into any other format. The data may also be transmitted over dedicated or common carrier communications lines.

The foregoing description while providing a novel and unique solution to the problem of position determination gives rise to certain manufacturing difficulties in providing an accurate positioned array of wires arranged in an x and y coordinate.

U.S. Pat. No. 3,904,821 proposed a solution to that problem by providing a position determination device employing strain wave transmission through a nondirectional transmission media. The transmission media is nondirectional in that it is not a discrete organization of transmission devices but rather a sheet of transmissive material operable in accordance with magnetostrictive principles. Coordinate location is accomplished by digitizing the time delay required for an induced strain wave to transverse the transmission media from a generation point to a reception point.

Specifically, a strain wave is magnetostrictively induced as a simultaneous unitary longitudinal line wave across an entire axis of a transmission media from a position in proximity with the edge of the data surface. Pick up means are coupled to the transmission media and respond to the propagating vibrational mode for providing a signal to a utilization device which will respond to the means triggering production of the field as well as to the pick up means in order to provide a position signal corresponding to the time of propagation of the vibrational mode from its time of generation to its time of pick up. Multiple coordinates are provided by multiple field generating devices located along various coordinate axes of the data defining surface. The magnetostrictive technique of digitizing has proven accurate and reliable, but requires expensive materials and great care in construction of the grid, as well as relatively expensive and complicated electronics for analyzing the raw data in order to provide the desired read-out of coordinate location.

Accordingly, there is a definite need in the art for a coordinate digitizing device which is less complicated and less expensive to make, but is also accurate and reliable.

SUMMARY OF INVENTION

A coordinate digitizer according to the invention herein generally comprises a data tablet including at least one grid consisting of a plurality of spaced-apart conductors connected at their ends by end busses, an inductor for inducing electrical signals into said grid from selectable positions on the data tablet, and a conductive receptor loop configured to contain an amount of flux from said grid which varies as a function of position across said grid wires, wherein the signals induced into the grid are distributed as a function of the position of the inductor, being larger in individual grid wires near the inductor, and the grid signals induce a signal in the receptor loop which, because of the receptor loop configuration, is a function of the inductor position on the data tablet. The inductor may be considered as the primary of a transformer, the grid as the secondary thereof and the receptor loop as the tertiary of the transformer.

The signals from the receptor loop may be sensed in either current or voltage modes. The signal from the receptor is provided continuously and is directly related to the position of the cursor coil on the data tablet, whereby the read-out of the digitizer is in real time.

The data tablet usually includes a grid for each of the X and Y axes. Each grid comprises a plurality of parallel, evenly-spaced-apart grid wires having their ends connected by end busses. Thus, the grid wires and portions of their connecting end busses can conduct current in loops. The X and Y grids are perpendicular to each other, for sensing in each of the X and Y axes. The inductor is usually a coil, incorporated into a cursor, stylus or the like, often referred to as a cursor herein, and driven by a signal generator. The signal generator and a battery may be housed with the coil to avoid lead wire. The cursor is placed on the surface of the grid and induces electrical signals therein, and in particular induces AC current flow in loops of the grid wires and end busses, with the strongest signal appearing in the grid wires most closely tangential to the cursor coil.

At least one conductive receptor loop is provided for each of the X and Y axis grids. A strong signal is obtained when the receptor loop is formed in a triangular loop having one leg parallel to the end bus of the grid, one leg extending along the grid wire at one edge of the grid and a hypotenuse proximate to and overlying the grid wires at an angle to the end bus. Considering the grid wires sequentially from the point to the base of the triangular receptor loop, a greater length of each successive individual grid wire is positioned within the receptor loop, and the hypotenuse diverges from the end bus of the grid. The signal induced into the receptor loop is proportional to the net flux from the grid which is trapped within the loop. Therefore, the strength of the signal induced into the receptor is a function of the length of signal-carrying grid wire which is within the loop and of the amount of field emanating from the end bus which is within the loop, wherein the signal in the receptor loop varies according to the position of the cursor coil on the grid. Thus, the position of the cursor can be derived from the induced signal in the receptor loop.

Various refinements to the basic digitizer structure described above are also within the purview of the invention herein. Compensation for variations in signal strength due to the proximity of the cursor coil to the grid is achieved by providing a second receptor loop for each of the X and Y grids, the second receptor loop being reversed with respect to the first receptor loop. This permits the cursor position to be calculated from the relative rather than actual signal strength in the two receptor loops. In some embodiments, the receptor loops share one leg. Also, the geometry of the receptor loop can be selected to provide a linear relation between receptor signal and cursor position, even compensating for irregularities due to edge effects and the like. The signals from the receptors are preferably processed in a microprocessor which calculates cursor position, stores and/or provides a read-out of the cursor position, and the microprocessor can be programmed to compensate for any minor deviations from linearity in the receptor output. Similarly, the geometry of the receptor loop can be selected to provide a non-linear relationship between cursor position and receptor output, which output may be utilized for a special purpose or may be utilized in connection with a microprocessor and a look-up table to provide calculation of position without necessity of linear output.

The cursor coil should not feed the receptor loop directly, unless special circuitry is provided to sort out contributions to the receptor loop signal. Therefore, the data tablet may have a data surface and adjacent receptor loop areas. Alternatively, in order to provide a largest possible area of usable data surface within the smallest data tablet, the portion of the grid wires proximate the receptor loops may be folded and deployed on the underside of the data tablet, suitably shielded from the cursor coil. The grid wires converge to a more densely deployed portion off of the usable data surface, so that both the X and Y grids are accommodated. The receptor area may also depend from the data surface, which with a transparent data tablet and back lighting forms a light-box coordinate digitizer.

Accordingly, it is a principal object of the invention herein to provide an improved coordinate digitizer.

A further object of the invention herein is to provide a coordinate digitizer which is highly accurate.

Another object of the invention herein is to provide a digitizer of relatively simple and economical construction.

An additional object of the invention herein is to provide a digitizer which automatically compensates for the proximity of the cursor coil to the surface of the data tablet.

A still further object of the invention herein provides a digitizer which provides an output indicative of cursor position in real time.

Other and more specific features and objects of the invention herein will in part be obvious and will in part appear from a perusal of the following description of the preferred embodiments and the claims, taken together with the drawings.

DRAWINGS

FIG. 7 is a top plan view of a dual-loop receptor, single axis digitizer according to the invention herein;

FIG. 8 is a graph showing the operation of the digitizer of FIG. 7;

FIG. 9 is a plan view of another dual-loop, single axis digitizer according to the invention herein;

FIG. 10 is a graph showing the operation of the digitizer of FIG. 9;

FIG. 11 is a plan of a coordinate digitizer according to the invention herein, including showing the top and bottom of the data tablet;

FIG. 12 is a plan view of the data tablet of the digitizer of FIG. 11, unfolded; and FIG. 13 is a perspective view of a light-box coordinate digitizer according to the invention herein.

The same reference numerals refer to the same elements throughout the various figures.

DESCRIPTION OF PREFERRED EMBODIMENTS

Figure 1:
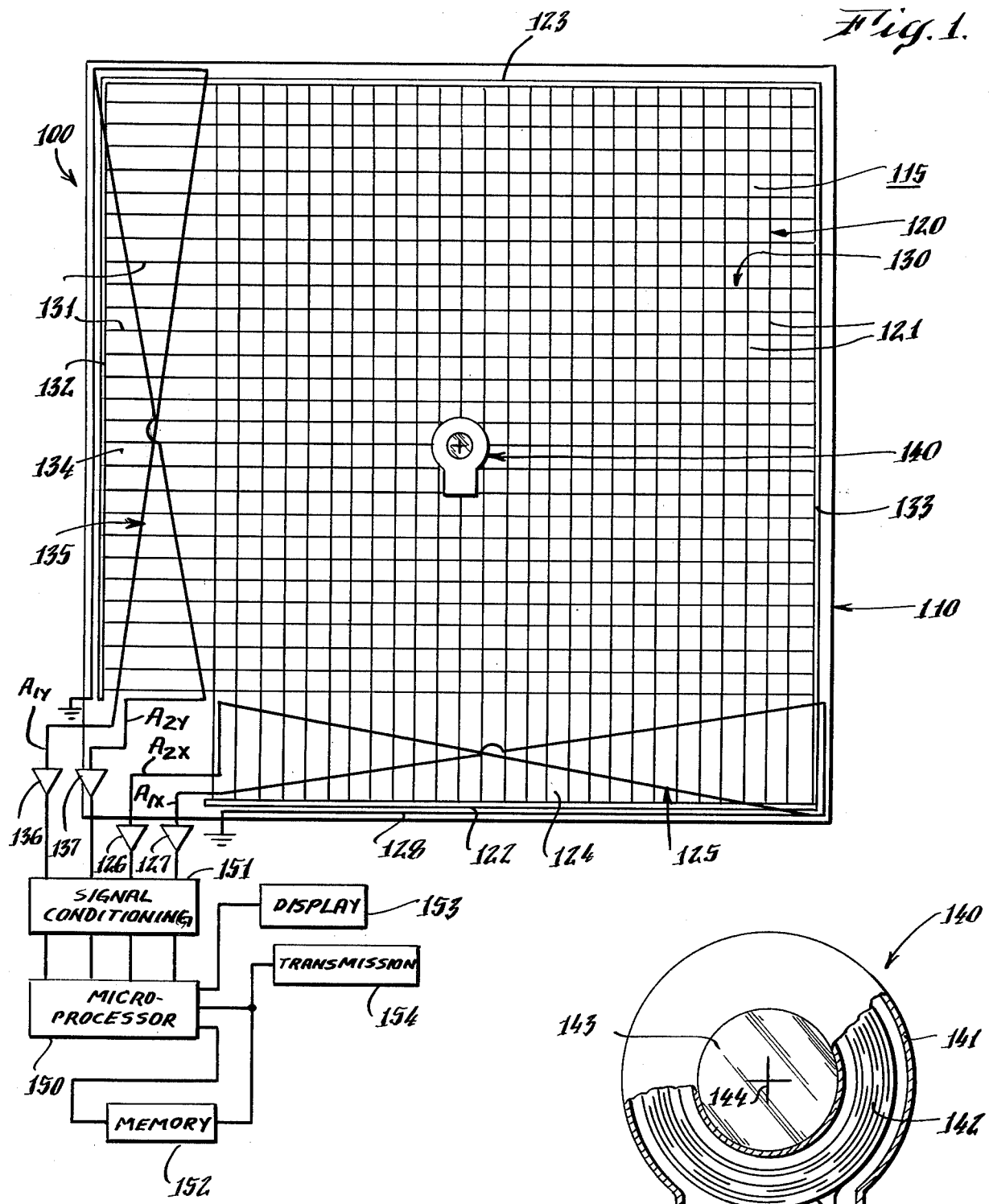
FIG. 1 illustrates a preferred coordinate digitizer according to the invention herein.

The invention herein relates to coordinate digitizers which operate via induction principles. A preferred digitizer 100 is shown in FIG. 1; however, discussion of other various digitizers illustrating principles of the invention will precede description of digitizer 100.

Figure 3:
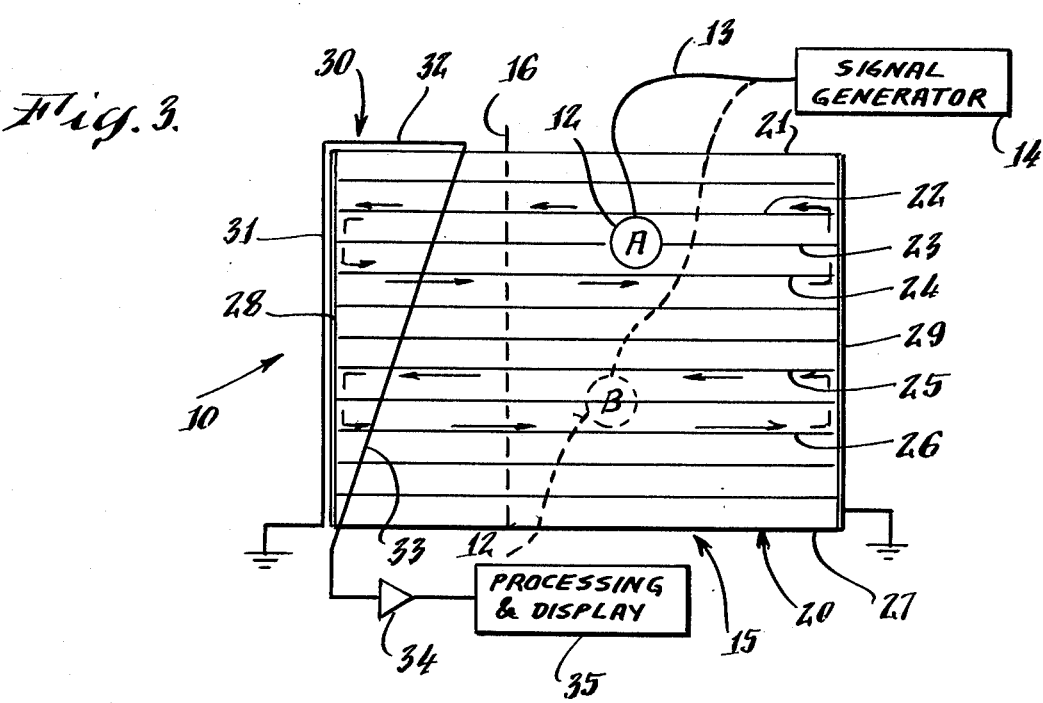
FIG. 3 is a top plan view of a single axis digitizer according to the invention herein.

A coordinate digitizer 10 according to the invention herein is shown in FIG. 3. The digitizer 10 is a very basic digitizer shown primarily to illustrate operating principles of the invention. The coordinate digitizer 10 generally comprises a data tablet 15 including a grid 20, an inductor 12 driven by a signal generator 14, a receptor 30, and processing means 35.

The grid 20 comprises a plurality of evenly-spaced apart, parallel planar grid wires, e.g. grid wires 21-27, the opposite ends of which are respectively connected together by end busses 28 and 29. As shown in FIG. 3, the grid wires are deployed horizontally and, therefore, digitizer 10 digitizes in the vertical or Y-axis direction only. The grid 20 is grounded, so as not to act as an antenna. The receptor loop 30 comprises a triangular wire loop, overlying the grid 20 adjacent its end bus 28. More particularly, the triangular receptor loop 30 has a first leg 31 parallel and adjacent to the end bus 28, a second leg 32 extending along the upper edge grid wire 21, and a third leg 33 deployed as the hypotenuse of the triangular loop, overlying the grid wires. The free end of wire 31 is grounded, and the end of hypotenuse 33 inputs to an amplifier 34, which feeds processing circuitry 35. The grid 20 is generally part of the data tablet 15, which supports the grid and includes a smooth surface upon which drawings, etc. may be positioned.

The inductor 12 may be a coil incorporated in a cursor, stylus, or the like, as is well known in the digitizer art, and will often be referred to as a "cursor" or a "coil" interchangeably. It comprises a coil of wire which is movable on the surface of the grid 20 and the purpose of the digitizer is to ascertain the position of the cursor on the grid. Inasmuch as the signal in the receptor is best derived from the grid absent signals directly from the coil, the portion of the grid 20 to the right of the dotted line 16 is the working or data surface of the data tablet. The cursor 12 receives input from a signal generator 14 over a flexible lead 13.

Figure 4:
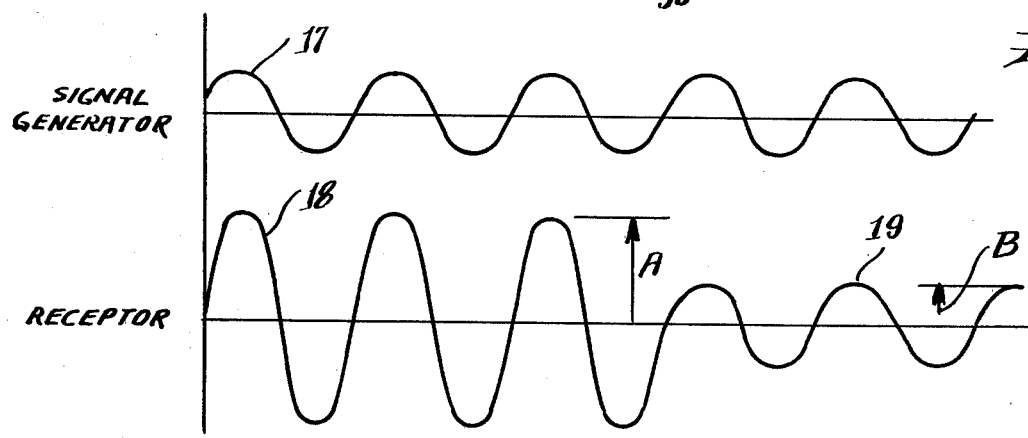
FIG. 4 is a graph showing the operation of the digitizer of FIG. 3.

The general operating principle of the digitizer 10 is that the field of coil 12 induces an electrical signal from the signal generator into the grid 20, the field of grid 20 induces an electrical signal into the receptor loop 30, wherein the size of the electrical signal induced into the receptor 30 is indicative of the position of the cursor on the grid. With further reference to FIG. 3 and also with reference to FIG. 4, the signal generator 14 provides the signal indicated at 17 in FIG. 4 to the cursor coil 12. The signal 17 is an AC or sinusoidally varying signal, although the wave form is not critical. The current flowing in the coil 12 creates a changing field which induces a current flow in the grid 20, and the flow of current is in loops with the strongest current appearing in the grid wires most closely tangential to the coil. Thus, when the coil 12 is in the position shown in solid lines in FIG. 3, a loop of current flows through the grid wires 22 and 24, and through the portions of the end busses 28 and 29 connecting those grid wires, as indicated by arrows. The flow in wire 23 is negligible because the coil 12 is centered on it. There is also current flow in the wires adjacent to wires 22 and 24, at levels which become smaller at increased distance from the coil. The direction of current flow in the loops, of course, changes as the signal from the signal generator cycles, with phase delays that are not important.

The alternating flow of current in the grid wires in turn creates a field which induces an EMF and flow of current in the receptor loop 30, and due to the configuration of the receptor loop, the size of the EMF and/or the flow of current in the receptor is indicative of the position of the cursor. More particularly, the flow of current in the grid wires establishes a flux, and as the current flow cycles, the flux changes which produces the flow of current in the receptor loop. The greater the net flux trapped within the receptor loop, the greater the signal (EMF or current) which will be induced in the receptor loop. Thus, when the coil is at the position A shown in solid in FIG. 3, substantial lengths of the grid wires 22, 24 are trapped within the loop, and the hypotenuse 33 of the loop has diverged from the end bus 28 a substantial distance, whereby a large portion of the flux generated by the current flow in the end bus is also trapped in the loop, resulting in the signal 18 of amplitude A shown in FIG. 4. Moving the cursor coil to position B in FIG. 3 sets up current flow in a loop primarily comprising grid wires 25 and 26 and the connecting portions of end busses, and results in the smaller signal 19 of amplitude B in the receptor loop 30. The size of the signal in the receptor increases as a function of the vertical or Y-axis position of the cursor on the grid. Processing means 35 can be utilized to convert the signal into numeric Y-axis information, for display, storage or transmission. It should be noted that the "signals" in the receptor loop can be measured in terms of either current or voltage, and amplifier 34 can be chosen to enhance either. The signal may not be a linear function of cursor position, due to numerous factors including shape and positioning of the receptor, edge effects when the cursor is near the edge of the grid, etc. The processing means can utilize circuitry or programming to compensate for this.

From a more theoretical viewpoint, although no precise equation has been derived for the behavior of the digitizer 10, certain functions have been noted. Whereas the magnetic field of a long current carrying wire is proportionate to 1/r where r is the distance from the wire, this relationship does not exist near the terminus of the wire. Instead, the field is proportionate to $1/r[1+d/(d^2+r^2)]$, where d is the distance from the end of the wire. Obviously, the field is stronger near the end of the wire. In the grid, each grid line "terminates" at the end busses, and thus the field is stronger near the end busses. The flow of current in the end bus also contributes to the greater field strength near the end busses. Referring again to FIG. 3, it is believed apparent that when the cursor is in position A, the triangular receptor loop traps or "contains" a greater net flux than when the cursor is at position B. The triangular receptor loop is configured to trap an increasing amount of flux as the cursor position varies along the Y-axis, providing data suitable for digitizing the Y-axis position.

Figure 5:
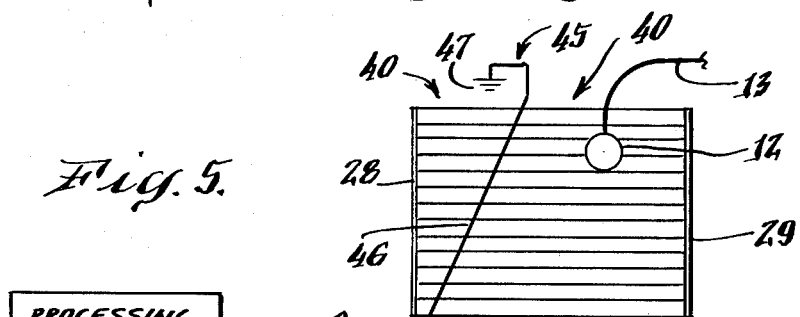
FIG. 5 is a top plan view of another single axis digitizer according to the invention herein.
Figure 6:
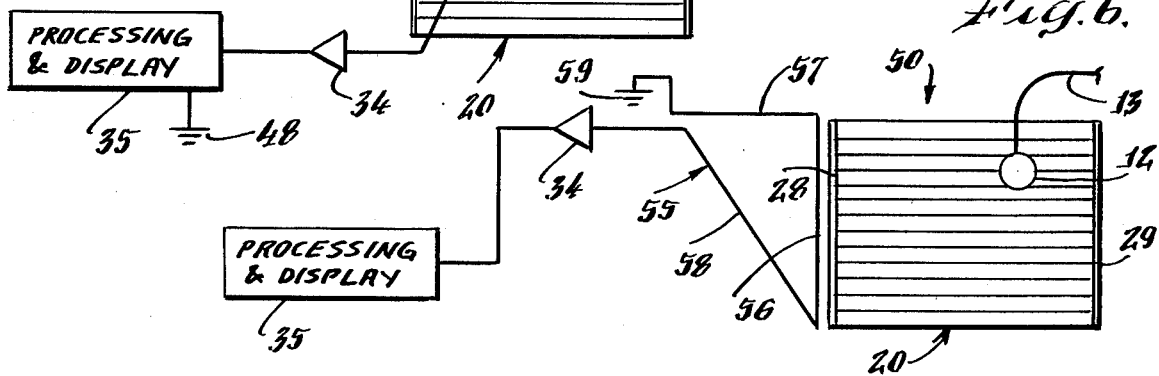
FIG. 6 is a top plan view of a further single axis digitizer according to the invention herein.

FIGS. 5 and 6 show additional single-axis coordinate digitizers further illustrating the operating principles of the invention, and particularly the relationship of the receptor loop and the grid. With reference to FIG. 5, a coordinate digitizer 40 comprises a grid 20, an inductor 12 connected to a signal generator not shown, and a receptor loop 45. The grid, inductors and wave generator are the same as described above, the grid is part of or supported by a data tablet, and the output of the receptor loop is provided to processing and display means 35. The receptor loop comprises a conductor 46 deployed proximate the grid wires (overlying or underlying them) at an angle to end bus 28 of grid 20. One end of conductor 46 is grounded at 47, and the other end is connected to amplifier 34 providing amplified output to the processing and display means 35. The circuitry embodied in the amplifier 34 and/or the processing and display means is grounded, as indicated at 48. Thus, the "loop" of the receptor loop 45 is in part formed by the ground, and when referring to a receptor loop in the specification and claims, a loop formed partially by ground paths is intended to be encompassed. The digitizer 40 provides a receptor output which varies as a function of cursor position in the Y-axis, the receptor loop being configured to contain a greater amount of net flux from the grid at higher Y-axis positions for the cursor.

With reference to FIG. 6, a further single-axis digitizer 50 comprises a grid 20, inductor 12 connected to a signal generator (not shown), and a receptor loop 55. The receptor loop 55 is triangular, including conductor 56 parallel and adjacent end bus 28 conductor 57 parallel to the top of grid 20 but extending away from it, and conductor 58 forming the hypotenuse of the loop. The receptor loop may be grounded at 59 of the free end of conductor 57, and the hypotenuse 58 may be connected to amplifier 34 and processing and display means 35. The receptor loop 55 does not overlay the grid 20, yet provides an output signal which varies as a function of cursor position. This illustrates that the receptor loop must merely be "proximate" the grid, i.e., close enough to trap a sufficient amount of grid flux to create a signal in the receptor loop.

The digitizers 10, 40 and 50 described above illustrate induction of an electric signal from a coil to a grid, wherein the grid in turn induces a signal into a receptor loop deployed in proximity to the grid. By selecting the configuration of the receptor loop the induced signal in the receptor loop will be a function of the position of the cursor coil on the grid. As will be more fully discussed below, the shape of the receptor loop can be altered to adjust the response. The previously-described basic digitizers are operable in one dimension or axis only and have other limitations which will become apparent in the ensuing description of further embodiments.

With reference to FIGS. 7 and 8, a digitizer 60 according to the invention herein is illustrated along with graphs of its operation. The digitizer 60 is simple in that it digitizes only the vertical or Y-axis, but illustrates another aspect of the invention herein, namely compensation for inductor-to-grid proximity variation in the output signal of the receptor. The digitizer 60 generally comprises a grid 20 consisting of a plurality of individual spaced-apart parallel grid wires connected by end busses 28, 29, a cursor coil 12 fed via a lead 13 from a signal generator, not shown, and a receptor loop 62. The receptor 62 is characterized by having two triangular loops labeled I and II in FIG. 7. Loop I consists of a first conductor 63 parallel to the end bus 28 of grid 20, a second conductor 64 extending along the upper grid wire 21, and a hypotenuse conductor 65. Loop II consists of a conductor 66 parallel to the end bus 28 and conductor 63, a conductor 67 parallel to the lower grid wire, and hypotenuse conductor 68 which extends across the grid, crossing with the hypotenuse conductor 65 of loop I. Legs 63 and 66 are grounded, and hypotenuses 65 and 68 are respectively connected to amplifiers 34, 34a, and input to processing means 69. The loops I and II are "reversed" with respect to each other. The grid and receptor may be part of a data tablet, not shown, including a smooth surface for supporting drawings or other work over the grid.

Each of the loops I and II of the receptor 62 provides an output which is a function of the position of the cursor 12 on the grid 20. In FIG. 7, two positions of the cursor are shown, the positions being labeled "A" and "B". With reference to FIG. 8, the input to the cursor 12 is illustrated as being a sine wave, labeled 70. With the cursor in position A, the output signal from loop I of the receptor loop 62 is shown at 72, having an amplitude $A_{IA}$ and the output signal of loop II is shown at 74 having amplitude $A_{IIA}$. The signal 74 is substantially larger than the signal 72 inasmuch as loop II is wider than loop I at the location of the grid wires having current induced therein by the cursor at location A. Stated differently, loop II contains more net flux for the cursor position. The numeric digitized position of the cursor may be derived from the outputs of the loops I and II according to the formula:

$$\frac{A_{IA} - A_{IIA}}{A_{IA} + A_{IIA}}.$$

When the cursor 12 is lifted from the surface of the grid 20, such as by the interpositioning of a thick drawing or other work between the surface of the grid and cursor, the strength of the signal induced into the grid wires from the cursor is reduced. This in turn reduces the strength of signal induced into loops I and II of the receptor loop 62. Again with reference to FIG. 8, a signal 73 (shown dotted) of smaller amplitude $A'_{IA}$ than signal 72 is derived from loop I when the cursor is separated from the surface of the grid. From loop II, a signal 75 (also shown dotted) having amplitude $A'_{IIA}$ is also reduced in value relative to the signal 74. However, when the position of the cursor is calculated according to the formula:

$$\frac{A_{IA}' - A_{IIA}'}{A_{IA}' + A_{IIA}'},$$

the result is the same despite the reduced signal strength. Thus, the double receptor loop automatically compensates for variations in proximity of the cursor with respect to the grid.

When the cursor 12 is moved to position B shown in FIG. 7, the output from loop I of receptor loop 62 increases, shown in FIG. 8 by signal 76 having an amplitude $A_{IB}$. The output of loop II, namely signal 78 having amplitude $A_{IIB}$, decreases relative to position A. Again, the formula:

$$\frac{A_{IB} - A_{IIB}}{A_{IB} + A_{IIB}}$$

is used to derive a numeric or digitized value representative of the location of the cursor, and the derived value does not change despite variations in proximity of the cursor to the grid. The processing means 69 carries out the calculations necessary to provide the desired numeric or "digitized" cursor position. The digitizer 60 thus illustrates proximity compensation through a receptor loop made up of a composite of individual loops.

A digitizer 80 according to the invention herein is illustrated in FIG. 9, and the graph of its output as a function of a cursor position is shown in FIG. 10. The digitizer 80 generally comprises a grid 20, inductor 12 and receptor loop 90. The grid 20 is again utilized for simplicity in explaining the concepts inherent in the digitizer 80. The inductor 12 is as described above, being fed by a signal generator 14 through lead 13, not shown, and is movable on the grid surface, being shown in FIG. 9 at a plurality of different positions A through G which correlate with the graph of FIG. 10. The receptor loop 90 is comprised of two triangular loops I and II which share one common leg 92 parallel to the end bus 28 of the grid 20. The common leg 92 is grounded at 93. Thus, the first loop I of receptor loop 90 comprises the common leg 92, a second leg 94 extending along the upper grid wire and a hypotenuse 95, from which the signal $A_I$ is taken, amplified as desired. The second loop II also comprises the common leg 92, a leg 96 extending along the lower edge of the grid, and a hypotenuse 97 from which the signal $A_{II}$ is derived. This compound receptor loop 90 is proximity compensating, similar to the receptor loop of digitizer 60 described above and shown in FIG. 7. The receptor loop output is fed to processing means, not shown.

With reference to FIG. 10, the signal calculated from the formula $$\frac{A_I - A_{II}}{A_I + A_{II}}$$

for each of the cursor positions A through G is illustrated, and the graph line 85 is the receptor loop output, per the above formula, as a function of cursor position. With the common leg 92 of the receptor loop 90 straight and parallel to the end bus 26, as it is shown solid in FIG. 9, the curve 85 exhibits a slight deviation from linearity, particularly at the ends 86 and 87, which correspond to cursor positions near the edge of the grid 20. Thus, the curve 85 has a very slight "S" shape. As noted above, the signal in the receptor loop is believed to be a function of net flux contained in the receptor loop. Altering the shape of the receptor loop also alters the net flux trapped within the loop and thus the signal induced into the loop. It follows that completely linear response curves, or even specially shaped response curves if desired, can be obtained by providing the proper shape of the receptor loop. Moving the common leg of the receptor loop to the position where it is shown dotted in FIG. 9, i.e., bowed in slightly over the grid, results in the response curve 88 shown dotted in FIG. 10, wherein the "S" which was apparent in curve 85 is somewhat reversed. No precise formula is known for adjusting the curve, but experimentation yields good results.

With reference to FIG. 1, a coordinate digitizer 100 according to the invention herein is shown, the coordinate digitizer 100 generally comprising a data tablet 110 including an X-axis grid, a Y-axis grid and receptor loops for each of them, a cursor 140 including an inductor and signal generating means, and a microprocessor 150 for providing numerically digitized output of the cursor position, in accordance with the principles of the digitizers described above.

The data tablet 110 includes a rectangular X-axis grid 120, which comprises evenly-spaced-apart parallel grid wires 121 which are in vertical orientation when viewed in FIG. 1 for digitizing along the horizontal X-axis, the wires 121 being connected by end busses 122 and 123. The Y-axis grid 130 consists of evenly-spaced-apart parallel grid wires 131 which are deployed horizontally in FIG. 1 for digitizing along the vertical Y axis. The grid wires 131 are connected together by end busses 132 and 133. It will be noted that the X and Y axis grids are rectangular wherein the data tablet has a data surface 115 consisting of the area in which the X-axis and Y-axis grids overlie each other. The X-axis grid 120 has a receptor area 124 adjacent the data surface area and the Y-axis grid has a receptor area 134, also adjacent the data surface area.

The data tablet further generally comprises receptor loops for both the X-axis and Y-axis grids. The receptor loop 125 serves the X-axis grid 120 and is deployed in the receptor area 124. The receptor loop 125 is of the compound or double loop type described above in digitizer 80 of FIG. 9, consisting of two triangular loops sharing a common base leg 128. Receptor loop 135, which is similar, is provided in receptor area 134 for the Y-axis grid 130. The data tablet 110 further includes a supporting means for supporting the X-axis and Y-axis grids (they may be printed circuit boards), and may comprise a plastic or other smooth top surface which covers the grids and provides suitable surface for receiving drawings and the like and for sliding the cursor about.

Figure 2:
FIG. 2 is a plan view of the cursor of the digitizer of FIG. 1.

A cursor 140 is provided as a part of the coordinate digitizer 100, and the cursor 140 is shown in greater detail in FIG. 2. The cursor 140 comprises a housing 141 which supports an inductor coil 142. A transparent plate 143 having cross hairs 144 is supported by the housing with the cross hairs centered with respect to the inductor coil 142. The cursor 140 is self-contained, further comprising signal generator circuitry 145 powered by a battery 146. Thus, no lead is required to be connected to the cursor, which makes for vastly improved convenience in use of the digitizer 100. This is, of course, possible because of the operating principles of the invention herein, wherein the input signal does not have to be referenced in order to derive the cursor position, and wherein the proximity compensating characteristics of the receptors also accommodate variations in signal strength in the cursor. The battery is removable for recharging or replacement.

The density of the grid lines on the X and Y axes grids and the size of the coil 142 are not critical, but it is preferred that the size of the cursor coil and spacing of the grid wires be chosen such that the cursor coil embraces several grid wires, in order to avoid granularity in the output signal.

The receptor loop outputs of the X-axis receptor loop 125 are amplified by amplifiers 126 and 127 and pass through a signal conditioning circuitry 151 which may include rectification or other desired conditioning, before being provided as inputs to the microprocessor 150. Similarly, the outputs of the Y-axis receptor loop 135 are amplified by amplifiers 136, 137 and passed through the signal condition circuitry 151 to microprocessor 150. As discussed above with respect to the simpler embodiments of coordinate digitizers according to the invention herein, the receptor loop 125 provides signals which are a function of the X-axis position of the cursor 140 on the data tablet and the receptor loop 135 provides signals which are a function of the Y-axis position of the cursor 40 on the data tablet. The microprocessor 150 is programmed to calculate and provide an output of the position in numeric or other desired format. The calculations in the microprocessor can take several forms, including solving equations, and in particular, the microprocessor can be programmed to compensate for non-linear response of the data tablet to cursor position. In some instances, it may prove desirable to use memory matching data tablet output to position. The microprocessor can store, display or transmit the digitized cursor position, by way of external memory 152, display terminal 153 and transmission terminal 154.

With reference to FIGS. 11 and 12, a digitizer 160 according to the invention herein is illustrated, which is characterized by a compact, folded data tablet. The digitizer 160 is generally comprised of a data tablet 162 (shown unfolded in FIG. 12 and from top and bottom views in FIG. 11), the data tablet 162 including an X-axis grid 170, a Y-axis grid 180 and receptor loops 171 and 181 for the respective grids. The receptor loops are connected to a microprocessor 150 through amplifiers, signal conditioning, etc. as described above. The digitizer 160 further comprises a cursor coil 165 fed by a wave generator 166 over flexible lead, but may use the self-contained cursor 140, if desired.

The data tablet 162 has a flat rectangular data surface 163 on which a cursor 165 is movable, and on which drawings or other materials to be digitized may be placed. The X-axis grid 170 comprises a plurality of spaced-apart parallel grid wires, e.g. wires 172 and 173, which are deployed on the top of the data tablet 162. The grid wires are connected together along one edge of the data surface by an end bus 174. The individual grid wires converge together as indicated at 175 adjacent to butt off the active data surface 163 of tablet 162. The grid lines 172, 173, etc. are then deployed in a parallel spaced-apart relationship, much more densely packed and thereby taking up much less area, in a receptor area 176. An end bus 177 connects the grid wires at the receptor area 176, and the receptor loop 171 is deployed in the receptor area. The Y-axis grid 180 is similar, comprising parallel evenly-spaced-apart grid wires 182, 183, etc. on the data surface 163 of the tablet 162, a converging area 185 and a densely-packed receptor area 186. End busses 184, 187 are also provided. The converging areas 175, 185 and the receptor areas 176, 186 are folded relative to the data surface 163 and are hence deployed on the underside of the data tablet 162, with suitable shielding between the grid wires on the surface of the data tablet. This permits the entire top of the data tablet to be active data surface.

The X-axis receptor loop 171 and the Y-axis receptor loop 181 provide inputs to the microprocessor 150, which provides the digitized output in desired format, as described above.

A light-box coordinate digitizer 190 is illustrated in FIG. 13, generally comprising a light-box data tablet 191, a cursor 140 (as described above), and a microprocessor 150. The light box data tablet 191 comprises a transluscent top panel 192, depending side walls 193, 194, and bottom panel 195. An additional side wall not seen in FIG. 13 connects side walls 195 and 195, and the open end may be provided with a cover. Lamp and reflector units 196, 197 are mounted in the space between the top and bottom panels for backlighting the top panel 192. The light-box data tablet 191 further comprises a Y-axis grid 200 including parallel, spaced-apart grid wires 201, 202, etc., connected by end busses 203, 204. The grid wires are in part deployed across the top panel 192 and extend onto depending side wall 193, which provides a receptor area 206 for a y-axis receptor loop 205. The light-box data tablet 191 also comprises an X-axis grid 210, deployed perpendicular to the Y-axis grid and having a receptor area and receptor loop on the side wall not seen in FIG. 13. The connection to microprocessor 150 is shown schematically by lead 211, although it will be understood that the receptor loops are connected as required to provide output signals to the microprocessor for digitizing the position of cursor 140. Drawings and other materials placed on top panel 192 can be backlighted, as desired, and digitized.

Thus, because the coordinate digitizers according to the invention herein require only spaced-apart conductive grid wires in the data area, and further require relatively simple grid-to-receptor loop coupling off the data surface, the coordinate digitizers can be provided in many desirable configurations and combinations.

The above-described digitizers are accurate, reliable, and convenient to use. They are also relatively inexpensive to manufacture, being far less complex than other known digitizers. It will be appreciated that the foregoing description of preferred embodiments and operating principles can be modified by those skilled in the art, and in fact, digitizers according to the invention lend themselves to special purpose applications. For instance, the grid surface (or data surface) could be non-planar; the grid wires could be non-parallel; and the grid wires could be unevenly spaced-apart. The receptor loops can take a variety of configurations and can be deployed in a variety of ways with respect to the grids, so long as the output of the receptor loop correlates in some predictable way to cursor position. The input signal must be an alternating electrical signal in the sense that a change in signal is necessary to achieve induction, but the shape, regularity of change and/or baseline of the input signal can vary. These and other changes can be made without departing from the spirit and scope of the invention which is limited only by the following claims.

We claim:

1. A coordinate digitizer comprising:
 (A) a first grid including a first plurality of conductive grid wires deployed spaced-apart on a data surface and end busses connecting the respective ends of the first grid wires;
 (B) an inductor adapted for movement to positions of interest on said data surface and for inducing electrical signals into said first grid; and
 (C) a first conductive receptor loop deployed proximate said first grid and configured to have induced therein from said first grid electrical signals which vary according to the position of the inductor on the data surface;
 wherein, upon application of an alternating electrical input signal to said inductor, the inductor induces alternating electrical signals into said first grid, said electrical signals being distributed in the first grid wires according to the position of the inductor on the data surface, and the alternating electrical signals in the first grid induce an electrical output signal in the first receptor loop which varies according to the position of the inductor on the data surface, whereby the position of the inductor can be determined from the output signal in the first receptor loop.

2. A coordinate digitizer as defined in claim 1 wherein said first receptor loop is a composite of at least two loop portions which provide functionally-related output signals, wherein the position of the inductor on the data surface can be determined from the receptor loop output signals independently of input signal strength or proximity of the inductor to the grid.

3. A coordinate digitizer as defined in claim 1 wherein said inductor is mounted in a housing movable on the data surface, the housing also mounting means for generating the alternating electrical input signal and battery means for powering the signal generating means.

4. A coordinate digitizer as defined in claim 1 wherein the first plurality of conductive grid wires are coplanar.

5. A coordinate digitizer as defined in claim 4 wherein the first plurality of conductive grid wires are parallel.

6. A coordinate digitizer as defined in claim 5 wherein conductive grid wires are evenly spaced apart.

7. A coordinate digitizer as defined in claim 6 wherein the inductor comprises a coil positioned generally parallel to the conductive grid wires, and the diameter of the coil is equal to at least twice the distance separating adjacent grid wires.

8. A coordinate digitizer as defined in claim 6 wherein one of the end busses is perpendicular to the grid wires and the receptor loop is deployed proximate that end bus.

9. A coordinate digitizer as defined in claim 8 wherein the receptor loop comprises a substantially triangular loop having one leg parallel to the end bus and a hypotenuse deployed at an angle with respect to the end bus and extending across the grid wires.

10. A coordinate digitizer as defined in claim 9 wherein the receptor loop is a composite of two loop portions, further including a second substantially triangular loop portion having one leg parallel to the end bus and a hypotenuse deployed at an angle with respect to the end bus and crossing the hypotenuse of the first triangular loop portion, the position of the inductor on the data surface can be determined from the output signals in the two loop portions of the receptor loop independently of the strength of the input signal and the proximity of the inductor to the grid.

11. A coordinate digitizer as defined in claim 10 wherein the two portions of the receptor loop share as a common leg the leg parallel to the end bus.

12. A coordinate digitizer as defined in claim 11 wherein the shape of the portions of the receptor loop are substantially triangular but deviated therefrom as required to provide output signals which are a substantially linear function of inductor position.

13. A coordinate digitizer as defined in claim 1 wherein the receptor loop comprises a conductive wire deployed at an angle with respect to one of the end busses connecting the ends of the grid wires.

14. A coordinate digitizer as defined in claim 13 wherein a portion of the receptor loop is provided by ground.

15. A coordinate digitizer as defined in claim 1 and further comprising:
 (D) second grid including a second plurality of conductive grid wires deployed spaced apart on the data surface and end busses connecting the respective ends of the second grid wires, said second plurality of grid wires crossing the first plurality of grid wires on the data surface; and (E) second conductive receptor loop deployed proximate said second grid and configured to have induced therein from said second grid electrical signals which vary according to the position of the inductor on the data surface;

wherein upon application of the alternating electrical input signal to said inductor, the inductor also induces alternating electrical signals into said second grid, said electrical signals being distributed in the grid wires of the second grid according to the position of the inductor on the surface, and the alternating electrical signals in the second grid induce an electrical output signal in the second receptor loop which varies according to the position of the inductor on the data surface, whereby the position of the inductor can be determined in two dimensions from the output signals of the first and second receptor loops.

16. A coordinate digitizer as defined in claim 15 wherein said first and second grids each comprise parallel coplanar evenly-spaced-apart grid wires and the respective grid wires of the first and second grids are deployed perpendicular to each other, and each of said first and second grids have receptor areas in which the grid wires extend beyond the data surface defined by crossing grid wires, and the respective receptor loops of the first and second grids are deployed in the respective receptor areas of the grids.

17. A coordinate digitizer as defined in claim 16 wherein the respective receptor loops for each of the first and second grids are composite receptor loops comprised of at least two loop portions which provide complimentary output signals.

18. A coordinate digitizer as defined in claim 17 wherein each of the composite receptor loops comprises two substantially triangular loop portions having their hypotenuses angled with respect to the end bus and extending across the grid wires, the hypotenuses of the two loop portions crossing.

19. A coordinate digitizer as defined in claim 18 wherein the inductor comprises a coil mounted in a housing movable on the data surface, the housing also mounting means for generating the alternating electrical input signal and battery means for powering the signal generating means.

20. A coordinate digitizer as defined in claim 19 wherein the diameter of the coil is at least twice the distance separating adjacent grid wires.

21. A coordinate digitizer as defined in claim 17 and further comprising:

(F) microprocessor receiving inputs from the outputs of the receptor loops, the microprocessor programmed to calculate the position of the inductor on the data surface from the output signals of the receptor loops.

22. A coordinate digitizer as defined in claim 21 wherein the microprocessor calculates the position from the current in the receptor loops.

23. A coordinate digitizer as defined in claim 21 wherein the microprocessor calculates the position of the inductor from the voltage in the receptor loops.

24. A coordinate digitizer as defined in claim 21 wherein the microprocessor includes memory storing receptor loop output values for known inductor positions, and the microprocessor calculates the position of the inductor on the data surface by comparing actual receptor loop outputs to the stored receptor loop output values.

25. An improved data tablet for use in a coordinate digitizing system of the type generally comprising an inductor connected to an alternating input signal source, a data tablet on which the inductor is movable, and calculating means for receiving the output of the data tablet and determining the position of the inductor thereon, the improved data tablet comprising:

(A) an X-axis grid including a first plurality of conductive grid wires deployed parallel, spaced-apart and coplanar, and end busses connecting the respective ends of the grid wires;

(B) Y-axis grid including a second plurality of conductive grid wires deployed parallel, spaced-apart, coplanar with respect to each other, and perpendicular to the grid wires of the X-axis grid, and end busses connecting the respective ends of the Y-axis grid wires, the crossing grid wire areas of said X-axis and Y-axis grids defining the data surface of the data tablet;

(C) means supporting said X-axis and Y-axis grids and forming a smooth surface overlying the crossing areas of said X-axis and Y-axis grids, for receiving drawings and the like and for receiving the inductor;

(D) each of said X-axis and Y-axis grids further comprising a receptor area comprising a portion of the grid wires and one end bus extending from the data surface; and (E) an X-axis receptor loop and a Y-axis receptor loop respectively deployed in the receptor areas of the X-axis and Y-axis grids, each receptor loop configured to have induced therein from its respective grid electrical signals which vary according to the position of the inductor on the data surface of the data tablet, said electrical signals in said receptor loops comprising the output of the data tablet.

26. An improved data tablet as defined in claim 25 wherein each of said X-axis receptor loop and Y-axis receptor loop comprises a composite loop including at least two loop portions each providing an output signal.

27. An improved data tablet as defined in claim 26 wherein the receptor loops are configured to provide output signals which are a substantially linear function of inductor position on the data surface.

28. An improved data tablet as defined in claim 26 wherein each of said X-axis and Y-axis receptor loops comprises two substantially triangular loop portions, each loop portion having a first leg parallel to the end bus of the receptor area and a hypotenuse portion deployed at an angle with respect to said end bus and extending across the grid wires, the hypotenuses of the two substantially triangular loop portions crossing.

29. An improved data tablet as defined in claim 28 wherein the two substantially triangular loop portions share a common leg parallel to the end bus.

30. An improved data tablet as defined in claim 29 wherein the substantially triangular loop portions deviate from triangular shape as required to provide output signals which are a substantially linear function of inductor position on the data surface.

31. An improved data tablet as defined in claim 25 wherein the receptor areas depend from the data surface, forming sidewall supports for the data surface.

32. An improved data tabled as defined in claim 31 wherein the means supporting said X-axis and Y-axis grids and forming a smooth surface overlying the crossing areas of said X-axis and Y-axis grids is translucent, and further comprising:

(F) lighting means deployed under said data surface for backlighting the data surface and drawings or the like placed thereon.

33. The improved data tablet as defined in claim 25 wherein the receptor areas are folded under the data surface and are magnetically shielded therefrom.

34. An improved data tablet as defined in claim 33 wherein the grid wires of the X-axis and Y-axis grids are closer together in the receptor areas than in the data surface area, and the grid wires converge between the data surface and the receptor areas, whereby the receptor areas are small with respect to the data surface and are readily accommodated on the underside of the data surface.

35. A cursor for use in a coordinate digitizing system of the type generally comprising an inductor, a data tablet on which the inductor is movable, and a calculating means receiving the output of the data tablet, the cursor comprising:

(A) housing adapted for movement across the surface of the data tablet;

(B) coil mounted in the housing, the coil being positioned with its plane parallel with the surface of the data tablet when the housing is placed on the data tablet;

(C) signal generating means mounted in said housing and connected to apply an alternating signal to the coil; and (D) battery means mounted in said housing for powering the signal generating means;

whereby the cursor is a self-contained unit for providing input to the data tablet.

36. A cursor as defined in claim 35 wherein the housing includes a transparent portion in the central portion of the coil, through which portions of drawings can be seen as the cursor is used.

37. A cursor as defined in claim 36 wherein the cursor includes a mark on the transparent portion, said mark centered with respect to the surrounding coil.

* * * * *